US00RE34014E

United States Patent [19]

Hundebol

[11] E Patent Number: Re. 34,014

[45] Reissued Date of Patent: Aug. 4, 1992

[54] METHOD AND APPARATUS FOR FINISHING SURFACES

[75] Inventor: Keld O. Hundebol, Ansager, Denmark

[73] Assignee: Udviklingscentret Hansen & Hundebol A/S, Ansager, Denmark

[21] Appl. No.: 706,414

[22] Filed: May 25, 1991

Related U.S. Patent Documents

Reissue of:

[64] Patent No.: 4,646,473
Issued: Mar. 3, 1987
Appl. No.: 778,526
Filed: Sep. 20, 1985

U.S. Applications:

[63] Continuation-in-part of Ser. No. 608,096, May 8, 1984, abandoned.

[30] Foreign Application Priority Data

May 11, 1983 [DK] Denmark ..... 2108/83

[51] Int. Cl.[5] ..... B24B 7/00

[52] U.S. Cl. ..... 51/90; 51/120; 51/283 R; 144/114 R

[58] Field of Search ..... 51/90, 120, 43, 76 R, 51/78, 283 R, 281 R, 328, 330; 144/114 R, 115

[56] References Cited

U.S. PATENT DOCUMENTS

| | | | |
|---|---|---|---|
| 907,058 | 12/1908 | Kraemer et al. | 51/43 |
| 1,217,417 | 2/1917 | Cumming | 51/90 |
| 1,566,659 | 12/1925 | Datton | 51/90 |
| 2,420,876 | 5/1947 | Freud | 51/90 |
| 2,948,087 | 8/1960 | Caton | 51/120 |
| 4,078,905 | 3/1978 | Oya | 51/76 R |

FOREIGN PATENT DOCUMENTS

| | | | |
|---|---|---|---|
| 21998 | 5/1905 | Denmark . | |
| 0046604 | 3/1982 | European Pat. Off. | 51/283 R |
| 468719 | 11/1928 | Fed. Rep. of Germany . | |
| 801498 | 1/1951 | Fed. Rep. of Germany . | |
| 1115608 | 10/1961 | Fed. Rep. of Germany . | |
| 2015385 | 10/1971 | Fed. Rep. of Germany . | |
| 3131753 | 2/1983 | Fed. Rep. of Germany . | |
| 817795 | 9/1937 | France . | |
| 819027 | 10/1937 | France . | |
| 1153833 | 3/1958 | France . | |
| 1244805 | 9/1960 | France . | |
| 1407811 | 5/1966 | France . | |
| 0127657 | 8/1982 | Japan | 51/283 R |
| 56609 | 11/1933 | Norway . | |
| 102156 | 7/1941 | Sweden . | |
| 870077 | 10/1981 | U.S.S.R. . | |
| 1047664 | 10/1983 | U.S.S.R. . | |
| 413555 | 7/1934 | United Kingdom . | |
| 0497412 | 3/1937 | United Kingdom | 51/90 |

OTHER PUBLICATIONS

S. N. Kozhevnikov et al. "Elementy Mekjanizmov," Oborongiz Moscow, 1956, p. 350, FIG. 1079.

Von D. H. Bruins et al. "Werlzeuge imd Werlzeugmaschinen fur Die Spanende Metalbearbeitung" Carl Homser Verlag, Munchen, 1980, pp. 138–141.

Hansen & Hundebol A/S "Fladder 300" System Type 300/AUT, 1983.

*Primary Examiner*—Robert A. Rose
*Attorney, Agent, or Firm*—Kenyon & Kenyon

[57] ABSTRACT

Workpieces having three-dimensional surfaces can be efficiently sanded by rotatable sanding members mounted on spindles which are supported for movement in a circle of revolution over the surfaces of the workpieces as the individual spindles are selectively rotated about their longitudinal axes in either of two opposite directions during predetermined portions of each circle of revolution. A sanding apparatus for accomplishing this function includes a cone clutch arrangement for selectively reversing the direction of rotation in accordance with a cam directed control arrangement acting on pivotally supported yokes carrying the individual spindles.

10 Claims, 2 Drawing Sheets

METHOD AND APPARATUS FOR FINISHING SURFACES

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of U.S. Patent Application Ser. No. 608,096 filed on May 8, 1984 and now abandoned.

BACKGROUND OF THE INVENTION

The invention relates to a method for finishing surfaces of workpieces by means of rotating sanding or polishing members, as well as an apparatus for carrying out the method.

In the manufacture of profiled objects such as cupboard doors, louvred doors or the like, the surfaces must be sanded to obtain the necessary smooth finish. For this use portable sanding machines are known, which can be manually moved across the objects. This requires a certain skill to obtain a uniform result, and masks or the like must be used to protect edges and corners against rounding during the sanding. As mentioned, it requires skill as well as a long time to sand such objects and where mass production of uniform objects is involved, the finishing process is very costly and labor-intensive.

SUMMARY OF THE INVENTION

It is the object of the invention to remedy these deficiencies, and this object is achieved by a method wherein the workpieces are passed under a number of sanding members mounted on preferably horizontal rotating spindles, which spindles are moved in a turning movement about a vertical axis, making the sanding members describe a circular movement over the workpieces as the spindle rotate. A hitherto unknown degree of efficiency and quality is obtained as the rotating sanding members are moved in a circular course over each workpiece, which has the effect that the workpieces become quite uniformly finished as the sanding members engage the exposed surfaces from all directions. In this way a completely uniform sanding result is assured.

Passing the workpieces under the sanding spindles, e.g., by means of a conveyor belt, permits continuous finishing of the surfaces to take place on an assembly line basis. By a suitable choice of sanding means, speed and pressure, the desired quality and speed of production can be obtained.

The sanding members may be rotated in various directions, for example, adjacent spindles may rotate in opposite directions, to achieve a very smooth surface, which will show no sanding traces since finishing in opposite directions will take place over all the surfaces as the workpieces are moved under the sanding members.

The direction of rotation as well as engagement and disengagement of the sanding members at predetermined places in the turning path of the spindles can be preselected, making it possible to program the sanding to finish certain surfaces more carefully and in certain directions, without wearing down sharp edges, corners, end surfaces and other pattern details, so that the sanding result is improved.

The spindles preferably are mounted radially in pivoted yokes and carry friction cones on their inner ends that are driven alternatively by an upper or a lower friction ring fixed to a central rotating wheel. By shifting the wheel vertically relative to the spindles, the friction cones can be made to bear against either the upper or the lower friction ring, which determines the direction of rotation of the spindles.

A preferred arrangement for shifting the friction cones between the upper and lower friction rings comprises cams which act on levers connected to the mounting yoke of each spindle, whereby engagement and disengagement as well as direction of rotation of the spindle may be programmed by suitably locating the cams.

BRIEF DESCRIPTION OF THE DRAWINGS

The invention will be described further in the following section with reference to the drawings, wherein.

DETAILED DESCRIPTION OF THE PREFERRED EMBODIMENTS

Figure 1:
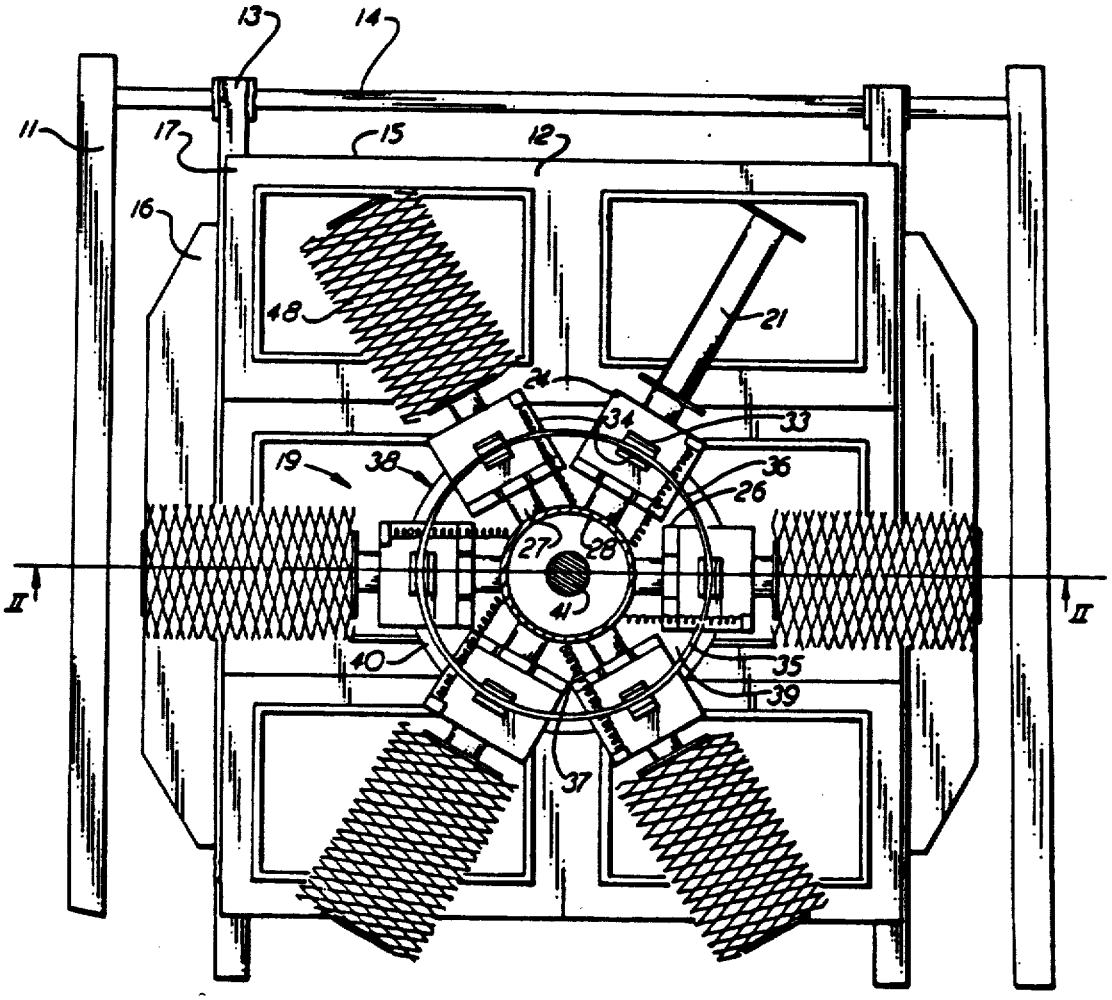
FIG. 1 is a plan view, partly in section, of a sanding apparatus taken in the direction of arrows I—I in FIG. 2.
Figure 2:
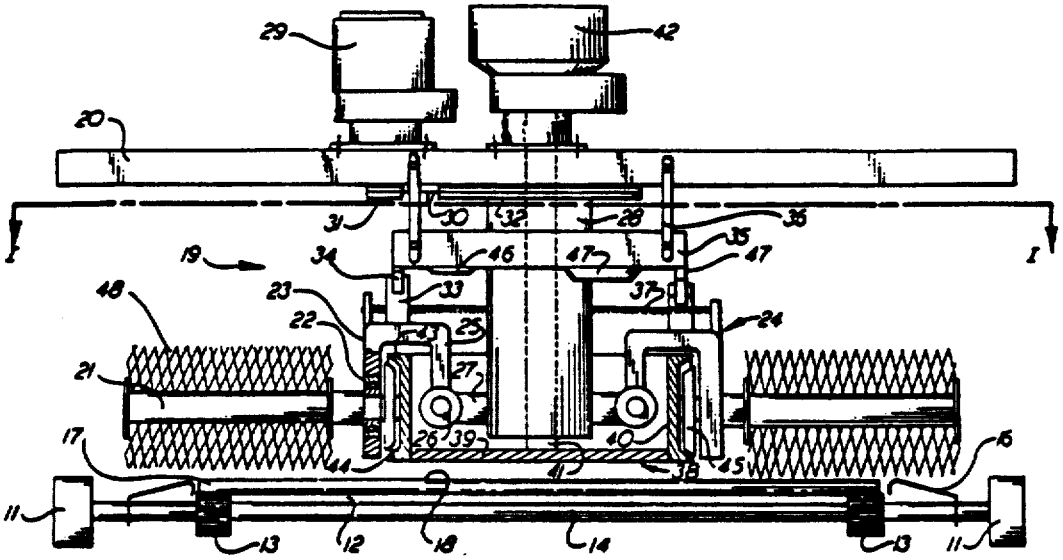
FIG. 2 is an elevation view, partly in section, of the apparatus taken in the direction II—II in FIG. 1.

FIGS. 1 and 2 show an embodiment of the invention in the form of a through-feed sanding machine for finishing and deburring paneled doors and gates and other wood items with three-dimensional surfaces.

The machine comprises a main frame 11 on which is mounted a conveyor for workpieces, such as the illustrated panelled doors 12. The conveyor comprises two conveyor belts 13, which are driven by a rotating shaft 14.

The doors 12 are placed on the conveyor with their longitudinal edges 15 in abutting relation, and on both sides of the conveyor stationary guards 16 are positioned close to the lateral edges 17 of the doors at the level of the upper surfaces 18 of the doors. In this way, both the longitudinal edges and the lateral edges of the doors are protected against contact by the sanding apparatus and so will remain sharp.

The sanding apparatus 19 itself is mounted on a subframe 20 which is supported by means (not shown) for permitting vertical adjustment of the sanding apparatus above the workpieces 12. In the illustrated embodiment, the sanding apparatus comprises six radial spindles 21, each of which is rotatably supported by a bearing 22 mounted in an outer leg 23 of a U-shaped yoke 24. Each yoke 24 has an inner leg 25 pivotally connected via a bearing 26 to a support 27 which is secured to a vertical drum 28. The upper end of drum 28 is suspended from the subframe 20 by a bearing means (not shown) to permit rotation of the drum above its vertical axis by a drive motor 29 mounted on the subframe and connected to the drum through a belt 30 and pulleys 31 and 32.

As mentioned above, each radial spindle 21 is supported by the outer leg of a corresponding yoke 23 for rotation about the longitudinal axis of the spindle, and the inner leg of each yoke is supported by the corresponding bearing 26 for pivoting movement about a horizontal axis and thus cause the spindle to tilt up and down in a vertical plane.

In the embodiment of FIGS. 1 and 2, the vertical tilting movement of each spindle is controlled by a lever arm 33 extending from the top of the corresponding yoke and carrying a roller 34 having a horizontal axis of rotation and which contacts a circular cam path on the underside of a stationary ring 35 secured to the subframe 20 by support rods 36. The roller 34 is urged into contact with the cam path by a tension spring 37 connecting the yoke 34 to the vertical drum 28. Various cams 46, 47 may be secured to the underside of the ring 35 to selectively change the level of contact of roller 34 with the cam path.

As is clearly apparent from the drawing, changing the level of roller contact will cause the yoke, and consequently the associated spindle, to tilt up or down as the level of the cam path is higher or lower, respectively.

The rotation of each spindle in turn is controlled by the tilt angle in conjunction with a wheel 38 comprising a disk 39 with a circumferential rim 40, the disk being fastened to the lower end of a vertical shaft 41 disposed concentrically inside drum 28 and rotatable about its longitudinal axis by a drive means 42 mounted on the subframe 20. The rim 40 of the wheel is provided with an upper friction ring 43 and a lower friction ring 44, each friction ring having a slanting face covered with a friction promoting material such as rubber or the like.

At the inner end of each spindle, located between the two slanting faces of friction rings 43,44, a friction cone 45 is secured. The relation between the cone, the wheel, the roller 34, and the undersurface of the stationary ring 35 is prearranged so that when the roller is urged into contact with the undersurface of the ring (representing the highest level of roller contact), the friction cone will contact the slanted face of the upper friction ring, and the spindle will rotate at a speed determined by the difference between the rotation speed of drum 28 and the rotation speed of shaft 41. At the same time, the spindles will revolve at the rotation rate of drum 28.

Low cams 46 and high cams 47 may be selectively secured to the undersurface of ring 35. The vertical height of low cams 46 is predetermined to tilt each yoke 24 and its associated spindle downward to an intermediate or neutral position when the corresponding roller 34 contacts the undersurface of the cam, such that the associated friction cone 45 is disengaged from both the upper and the lower friction rings. This position is shown for the left hand spindle in FIG. 2. The vertical height of high cams 47 is predetermined to tilt each yoke 24 and its associated spindle still further downward to a lowermost position when the corresponding roller 34 contacts the undersurface of the high cam, such that the associated friction cone 45 engages the lower friction ring, thereby reversing the rotational direction of the spindle. This portion is shown for the right-hand spindle in FIG. 2.

Each spindle carries a cylindrical sanding member 48. The sanding member typically is an assembly by juxtaposed rings with thin sanding threads, which engage the workpiece in an efficient way. However, any other form of a sanding member, such as a wire brush or a polishing drum may be used, as required.

The above-described construction permits programming the sanding process, as the choice of the circumferential length and the height of the cams or guides will define the sanding process in such a way that the machine can be programmed in any desired way, depending on the prescribed sanding work.

As previously mentioned, subframe 20 can be raised or lowered in relation to the conveyor belt thus permitting the sanding apparatus to be adjusted in height relative to workpieces 12 and to the conveyor feed mechanism, thereby controlling the sanding pressure. The sanding pressure also changed by tilting the spindles; so that the pressure will be greater when a friction cone engages the upper friction ring than when it engages the lower friction ring.

Figure 3:
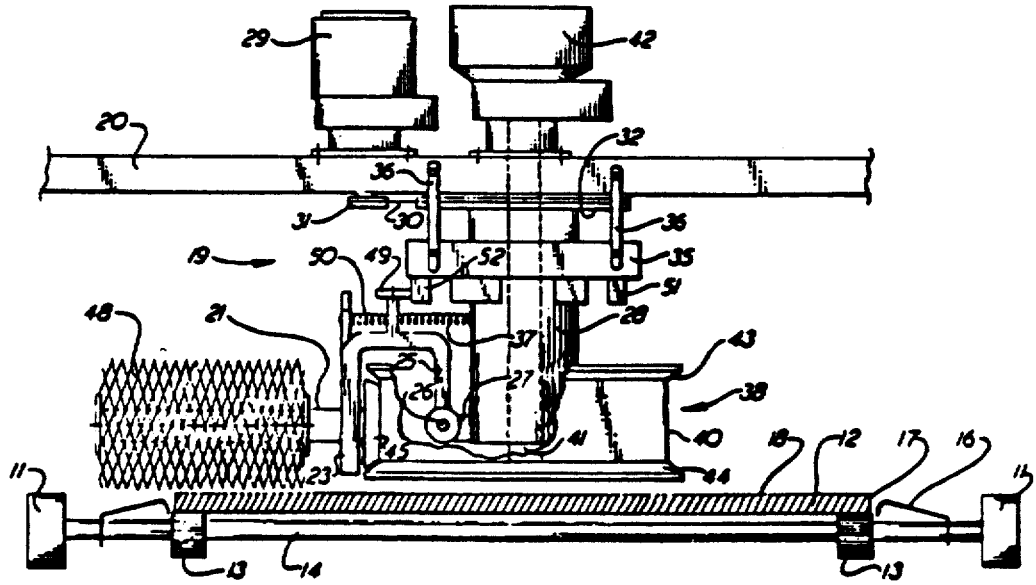
FIG. 3 is an elevation view, partly broken away, of another embodiment of the sanding apparatus.

FIG. 3 shows another embodiment of the apparatus in which the same elements are identified by the same reference numerals. In FIG. 3 only one sanding member 48 is shown, but it is implicit that are several sanding elements as shown in FIGS. 1 and 2. In fact, the embodiment of FIG. 3 is substantially the same as that of FIGS. 1 and 2, except for the cam arrangement for controlling the rotation of the spindles. Thus, this embodiment is also provided with a U-shaped yoke 24 pivotally supported by a bearing 26 which is secured to a vertical drum 28 concentric with a rotating driving wheel 38, the yoke in turn rotatably supporting a spindle 21 carrying a sanding member 48 and a friction cone 45, and the yoke 24 and the spindle 21 are turned around the vertical axis of drum 28 and the wheel 38 by the drive motor 29.

Thus, the yoke 24 can tilt around the bearing 26 so that the friction cone 45 can be brought into contact with the [uper] *upper* and the lower friction rings 43,44, respectively, on the wheel 38.

As mentioned above, the principal difference of the embodiment of FIG. 3 lies in its spindle tilt control mechanism. On the upper side of each yoke 24 a roller 49 is mounted on a lever arm 50 for rotation about a vertical axis. A tension spring 37 connecting the lever arm 50 to the drum 28 urges the lever arm radially inward, thereby tilting the yoke 24 and spindle 21 upward until friction cone 45 engages the upper friction ring 43. Thin cams 51 and thick cams 52 may be secured to the underside of stationary ring 35 to cause the spindle to tilt such that the friction come is disengaged or engages the lower friction ring 44, when the roller 49 contacts the outer circumference of the respective cam as the spindle assembly revolves by action of drive motor 29.

By a suitable choice of the circumferential length and the radial thickness of the cams, the rotation of the spindles may be stopped (with thin cams 51) or reversed (with thick cams 52) over any desired sector of spindle assembly revolution.

By choosing the dimensions of the cams and their placement on the ring 35, the sanding can be programmed in such a way that it may be adapted individually according to need. Furthermore, the very rigid construction of yoke, support bearing, and spindle provides a completely non-vibrating assembly and thus a smooth and precise sanding result.

The illustrated drive motor 29 for drum 28 and the drive means 42 for shaft 41 of both illustrated embodiments can have infinitely variable speed adjustment, whereby the desired completely programmable through-feed sanding machine can be obtained.

Instead of the described embodiments with tiltable yokes and cams, the machine may be provided with different kinds of control and adjustment means. Thus, the friction cones of the spindles may be engaged and disengaged by means of hydraulic or electromagnetic means, or an independent drive motor for each spindle can be provided.

I claim:

1. Apparatus for finishing the surface of a workpiece, the apparatus comprising:

a frame, a plurality of elongated spindles, each having a longitudinal axis;

a sanding member mounted on each spindle, each sanding member being in the form of a body of revolution having a longitudinal axis coinciding with the longitudinal axis of the corresponding spindle;

means for supporting the plurality of spindles from said frame such that a circumferential portion of each sanding member lies in a common plane, and the longitudinal axis of the sanding members intersect an axis perpendicular to said common plane;

means for revolving said supporting means about said axis perpendicular to said comon plane; and means for selectively rotating each spindle about its longitudinal axis in either of two opposite directions during separate selected portions of each revolution of said supporting means, said means for selectively rotating each sanding member comprising:

a friction cone affixed to a radially inner end of each spindle;

a first friction ring;

a second friction ring;

means for mounting the first and second friction rings in fixed spaced relation concentrically perpendicular to said axis perpendicular to said common plane with said friction cones disposed between the first and second friction rings, the spacing between the friction rings being such that each friction cone can contact only one of the friction rings at a time; and said means for supporting said plurality of spindles comprises:

means for selectively moving each spindle between a first position in which the associated friction cone engages the first friction ring and a second position in which the associated friction cone engages the second friction ring.

2. Apparatus according to claim 1 wherein said means for selectively moving each spindle between said first position and said second position comprises:

a yoke for each spindle, each yoke being rotatably connected to said supporting means for pivoting about an axis parallel to said common plane;

bearing means for rotatably connecting each spindle to the associated yoke; and means for controllably pivoting said yoke to move the associated spindle between said first and second positions.

3. Apparatus according to claim 2 wherein the longitudinal axis of each spindle intersects the pivot axis of the corresponding yoke.

4. Apparatus according to claim 2 wherein the means for controllably pivoting said yoke comprises a cam follower fixed to the yoke and a cam member fixedly connected to the frame, the cam member having a circular cam path contacted by the cam follower as the supporting means revolves around said axis perpendicular to said common plane.

5. A method for finishing a surface of a workpiece, the method comprising:

(a) contacting the surface of the workpiece with a circumferential portion of at least one sanding member in the form of a body of revolution having a longitudinal axis;

(b) revolving the sanding member in a circle of revolution over the surface of the workpiece; and (c) rotating each sanding member about its longitudinal axis in a preselected first direction during a first portion of each circle of revolution and rotating each sanding member in a second direction, opposite to the first direction, during a second portion of each circle of revolution.

6. A method according to claim 5 wherein the at least one sanding member comprises a plurality of sanding members.

7. A method according to claim 6 wherein the plurality of sanding members are arranged with the longitudinal axis of each sanding member intersecting the center of said circle of revolution.

8. A method for finishing a surface of a workpiece, the mentioned comprising:

(a) contacting the surface of the workpiece with a circumferential portion of at least one sanding member in the form of a body of revolution having a longitudinal axis;

(b) revolving the sanding member in a circle of revolution over the surface of the workpiece; and (c) rotating each sanding member about its longitudinal axis in a preselected direction during a first portion of each circle of revolution and stopping rotation of each sanding member during a second portion of each circle of revolution.

9. A method according to claim 8 wherein the at least one sanding member comprises a plurality of sanding members.

10. A method according to claim 9 wherein the plurality of sanding members are arranged with the longitudinal axis of each sanding member intersecting the center of said circle of revolution.

* * * * *

UNITED STATES PATENT AND TRADEMARK OFFICE

CERTIFICATE OF CORRECTION

PATENT NO. : Re. 34,014

DATED : August 4, 1992

INVENTOR(S) : Keld O. HUNDEBOL

It is certified that error appears in the above-identified patent and that said Letters Patent is hereby corrected as shown below:

Column 3, line 60, change "by" to --of--.

Column 4, line 8, between "also" and "changed" insert --is--.

Column 6, line 36, change "mentioned" to --method--.

Signed and Sealed this

Twenty-eighth Day of September, 1993

Bruce Lehman

*Attest:*

BRUCE LEHMAN

*Attesting Officer*

*Commissioner of Patents and Trademarks*